United States Patent [19]
Nahon

[11] 3,815,096
[45] June 4, 1974

[54] STACKING STORE HAVING OVERFLOW INDICATION FOR THE TRANSMISSION OF DATA IN THE CHRONOLOGICAL ORDER OF THEIR APPEARANCE

[75] Inventor: Roland Sylvain Nahon, 36 rue du General Delestraint, Paris, France

[73] Assignee: Jeumont-Schneider, Paris, France

[22] Filed: June 5, 1972

[21] Appl. No.: 259,412

[30] Foreign Application Priority Data

June 7, 1971 France ............................ 7120442

[52] U.S. Cl. ........................................ 340/172.5
[51] Int. Cl. ........................................ G11c 19/00
[58] Field of Search ............................ 340/172.5

[56] References Cited

UNITED STATES PATENTS

| | | | |
|---|---|---|---|
| 3,234,524 | 2/1966 | Roth | 340/172.5 |
| 3,274,566 | 9/1966 | McGrogan, Jr. | 340/172.5 |
| 3,351,917 | 11/1967 | Shimabujuro | 340/172.5 |
| 3,388,383 | 6/1968 | Shivdasani et al. | 340/172.5 |
| 3,504,353 | 3/1970 | Guzak, Jr. | 340/172.5 |
| 3,540,004 | 11/1970 | Hansen | 340/172.5 |
| 3,571,808 | 2/1971 | Washizuka | 340/172.5 |
| 3,585,604 | 6/1971 | Lloyd | 340/172.5 |
| 3,623,020 | 11/1971 | Mao | 340/172.5 |
| 3,646,526 | 2/1972 | Fagan et al. | 340/172.5 |
| 3,651,481 | 3/1972 | Evans et al. | 340/172.5 |

*Primary Examiner*—Paul J. Henon
*Assistant Examiner*—Paul R. Woods
*Attorney, Agent, or Firm*—Raymond A. Robic

[57] ABSTRACT

A stacking store having overflow indication and of use for the transmission of binary data in the chronological order of their input (write-in). The stacking store is characterized in that it comprises store circuits, a first and second auxiliary circuit and a clock. The store circuits are equal to the number of bits in the data to be transmitted and each store circuit comprises: a *n* stage shift register (each stage having two inputs connected to one another and one output); and three logic type routing gates having two inputs and one output, viz. a first gate whose first input receives the input bit corresponding to the store circuit and whose other input receives a logic type signal permitting write-in into the store, such signal being called "first logic signal" hereinafter, a second gate whose first input is connected to the output of the first gate and whose second input is connected to the output of the third gate, the register having its input connected to the output of the second gate and its output connected to the first input of the third gate, the second input of the latter gate receiving the complement of the first logic signal, the output of each store circuit being the output of its register. The first auxiliary circuit comprises a n stage shift register identical to the previous shift register, the two inputs of the first stage not being connected to one another as in (1), one of the latter inputs receiving a logic control signal called the "second logic signal" and serving to erase from the store the information output thereby, the other input being connected to the output of a logic gate having two inputs connected to the respective outputs of two other logic gates each having two inputs and one output, the first of the latter gates having an input receiving an auxiliary bit called "overflow bit" and the other input receiving the first logic signal, the second of the latter gates having an input receiving the complement of the first logic signal, the other input being connected to the output of the previous register which thus forms the output of the first auxiliary circuit, the logic state of the last-mentioned output possible saturation of the store. The second auxiliary circuit comprises a *n* stage shift register identical to the shift register of the first auxiliary circuit, the first input of the first stage receiving the second logic signal while the second input of the last-mentioned stage is connected to the output of a logic gate having two inputs, one of which receives the complement of the first logic signal while the other input is connected to the output of another logic gate having two inputs, one receiving the complement of the first logic signal and the other being connected to the output of the corresponding register, the latter output delivering an auxiliary bit called "marking bit" and forming the output of the second auxiliary circuit. The clock pulse generator triggers the stepping-on of the data towards the store output in all the shift-register set forth previously.

1 Claim, 1 Drawing Figure

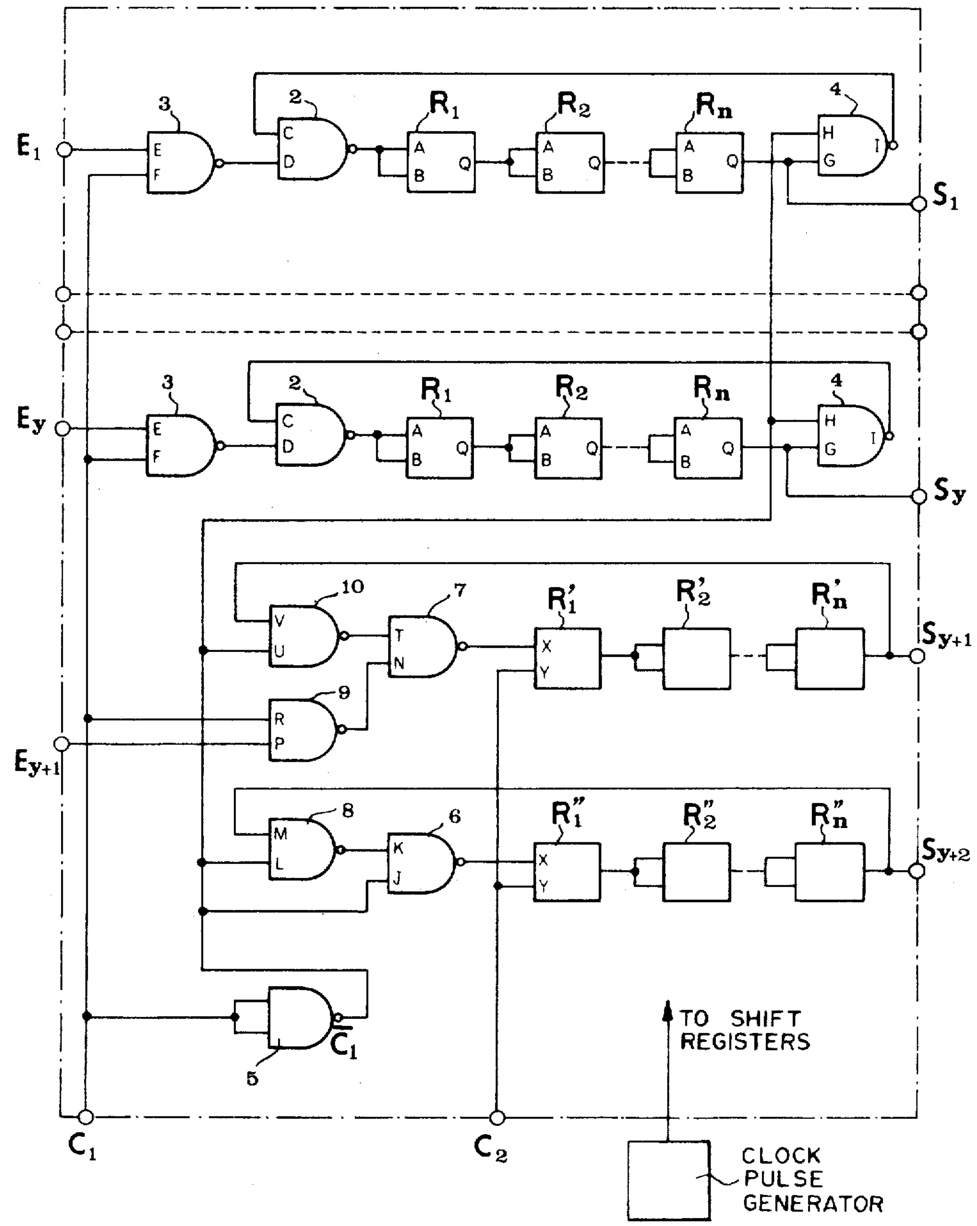
E1
Ey
Ey+1
S1
Sy
Sy+1
Sy+2
C1
C2
R1
R2
Rn
R'1
R'2
R'n
R"1
R"2
R"n
TO SHIFT REGISTERS
CLOCK PULSE GENERATOR

STACKING STORE HAVING OVERFLOW INDICATION FOR THE TRANSMISSION OF DATA IN THE CHRONOLOGICAL ORDER OF THEIR APPEARANCE

In data transmission where it is required more particularly to process the transmitted date at a rate independent of the rate of the read-out facility, which processes the date on a time priority basis, stacking memories or stores are used which store the data in the chronological order of their appearance.

This invention relates to a stacking store adapted to receive a binary data item and simultaneously to step-on previously stored data towards the store output without impairing the chronological order of their write-in. By action on a controlling clock signal or pulse, the stored data can be moved on towards the store output in consecutive shifts so that the oldest data item is the first one available at the outputs of the stacking store.

A feature of a store of this kind is its association with two logic type control signals — two first acting on the routing or gating of the input or write-in bits so as to permit or inhibit write-in, and the second for erasing the data item removed from the store — and with two extra bits, namely an "overflow (saturation) bit" and a "marking bit." The overflow bit, which serves to detect saturation of the store, may or may not accompany the data item presented to the read-out facility connected to the store outputs and is prepared by logic gates and a delay circuit controlled from the first logic type control signal and from the marking bit, which accompanies the written-in data item.

Data output rate is adapted to the reading rate of the read-out facility, but the write-in rate can be as required.

The stacking store according to the invention is characterized in that it comprises:

1. store circuits to the number of bits in the data to be transmitted, each store circuit comprising: a n stage shift register (each stage having two inputs connected to one another and one output); and three logic type routing gates having two inputs and one output, viz. a first gate whose first input receives the input bit corresponding to the store circuit and whose other input receives a logic type signal permitting write-in into the store, such signal being called "first logic signal" hereinafter, a second gate whose first input is connected to the output of the first gate and whose second input is connected to the output of the third gate, the register having its input connected to the output of the second gate and its output connected to the first input of the third gate, the second input of the latter gate receiving the complement of the first logic signal, the output of each store circuit being the output of its register;

2. a first auxiliary circuit comprising a *n* stage shift register identical to the previous shift register, the two inputs of the first stage not being connected to one another as in (1), one of the latter inputs receiving a logical control signal called the "second logic signal" and serving to erase from the store the information output thereby, the other input being connected to the output of a logic gate having two inputs connected to the respective outputs of two other logic gates each having two inputs and one output, the first of the latter gates having an input receiving an auxiliary bit called "overflow bit" and the other input receiving the first logic signal, the second of the latter gates having an input receiving the complement of the first logic signal, the other input being connected to the output of the previous register which thus forms the output of the first auxiliary circuit, the logic state of the last-mentioned output indicationg possible saturation of the store;

3. a second auxiliary circuit comprising a n stage shift register identical to the shift register of the first auxiliary circuit, the first input of the first stage receiving the second logic signal while the second input of the last-mentioned stage is connected to the output of a logic gate having two inputs, one of which receives the complement of the first logic signal which the other input is connected to the output of another logic gate having two inputs, one receiving the complement of the first logic signal and the other being connected to the output of the corresponding register, the latter output delivering an auxiliary bit called "marking bit" and forming the output of the second auxiliary circuit;

4. a clock pulse generator triggering the stepping-on of the data towards the store output in an the shift register set forth previously.

The invention will be better understood if reference is made to an embodiment shown in the accompanying single drawing.

The store according to the invention, the circuit diagram for which is shown inside the chain-dotted line framing, comprises a number of inputs — visible on the left-hand side of the framing and referred to by the letter E followed by an index — and a number of outputs — visible on the right-hand side of the framing and referred to by the letter S followed by an index — there being one more output than there are inputs. Associated with the store are two logic control signals $C_1$, $C_2$ for which the inputs are at the bottom of the framing, $C_1$ being a store write-in permission signal and $C_2$ being an erase signal for data withdrawn from the store. The system is composed exclusively of known shift registers and two-input NAND elements.

Data for storage is first encoded in binary form by means of *y* bits associated with the logic inputs $E_1$, $E_2$, $E_3$, . . . $E_y$ respectively and with the logic outputs $S_1$, $S_2$, $S_3$, . . . $S_y$ respectively.

An extra bit of rank y+1, called the "overflow bit," is applied to input $E_{y+1}$, associated with which is an output $S_{y+1}$. The function of the overflow bit is to detect saturation of the store. A further output $S_{y+2}$ is provided for a marking bit whose function will be described hereinafter. Also associated with the store is a clock pulse generator.

Disposed between each input $E_1$ . . . $E_y$ and the corresponding output $S_1$ . . . $S_y$ is a store or memory circuit comprise n stage shift register $R_1$, $R_2$, . . . $R_n$ and e.g., NAND routing gates 2–4. There are in all *y* identical store circuits. The drawing shows only the store circuits for the end bits $E_1$ and $E_y$; to simplify the diagram the store circuits for the other intermediate bits are indicated merely by chain lines.

Each stage of shift register $R_1$ . . . $R_n$ has two inputs A, B which are connected to one another and to an output Q, and each stage has *z* addresses. Store capacity is therefore *nz* items.

The inputs A, B of the first stage $R_1$ are connected to the output of the NAND circuit 2 having two inputs C, D. Input D is connected to the output of a second NAND circuit 3 having two inputs E, F. Input E receives the corresponding bit of the data item, and item F receives a logic control signal $C_1$.

Output Q of the nth stage $R_n$ is connected to an input G of a NAND circuit 4 whose second input H receives the logical signal $C_1$ and whose output I is connected to the second input C of circuit 2; output Q of the *n*th stage delivers the output signal having the reference S plus the index corresponding to the particular bit concerned.

A signal $\bar{C}_1$ is provided by a NAND circuit 5 whose two inputs are connected to the input for the signal $C_1$. The two extra output signals $S_{y+1}$ and $S_{y+2}$ are provided from two complementary circuits each comprising: a n stage shift register (identical to the shift registers hereinbefore mentioned) $R'_1$, $R'_2$, . . . $R'_n$ and $R''_1$, $R''_2$, . . . $R''_n$ whose stages are in series with one another just like the stages at shift register $R_1$ to $R_n$ except that the inputs X, Y of the first stages $R'_1$, $R''_1$ are energized separately; and NAND circuits.

Inputs Y of the stages $R'_1$ and $R''_1$ receive the logic control signal $C_2$. Input X of stage $R'_1$ is connected to the output of a NAND circuit 7 whose input N is connected to the output of a NAND circuit 9 having two inputs R and P, input R receiving the signal $C_1$ and input P receiving the overflow bit $E_{Y+1}$. Input T of circuit 7 is connected to the output of a NAND circuit 10 whose input U receives the signal $\bar{C}_1$ and whose input V receives the output signal $S_{y+1}$ of the *n*th stage $R'_n$.

Input X of stage $R''_1$ is connected to the output of a NAND circuit 6 having two inputs J, K, input J receiving signal $\bar{C}_1$ and input K being connected to the output of a NAND circuit 8 having one input L receiving signal $\bar{C}_1$ and the other input M receiving the output signal $S_{y+2}$ of the *n*th stage $R''_n$.

Each stage of the store receives a clock pulse from the clock pulse generator. The shift registers R, R', R'' are so devised that if either of the two inputs A, B or X, Y receives a logic signal in the 0 state, the output logic signal is in the 0 stage after *z* clock signal or pulses, and when both inputs receive 1 signals, the output logic signal is 1.

The stacking store has two possible forms of operation — either direct access of the data to inputs $E_1$ to $E_y$ or looping the outputs $S_1$ to $S_y$ back to the respective inputs $E_1$ to $E_y$ by means of the NAND circuits 4 — i.e., stored data can be derived either directly from the inputs E or from the corresponding outputs S. Both possibilities start from the signal $C_1$ which acts on the NAND circuits 3,4.

Each binary bit is converted into a signal for entering the first stage $R_1$ of shift register by means of the NAND circuits 3, 2; a check can be made for each of the *y* bits of the data that the logic state of the A B inputs is the same as the logic state of the input E of the bit considered if the signal $C_1$ is in the 1 state and that, conversely, if the signal $C_1$ is in the 0 state, the logic state of the A B inputs is the same as the logic state of the output S of the bit concerned.

Operation of the store will now be considered from three aspects:

a. input of data item into the store, b. output of a data item from the store, c. overflow of the store.

An input or write-in of a data in the store occurs in a phase when signal $C_1$ is in the 1 state — the write-in permission phase. In this phase the data at inputs A and B of registers R are the data of inputs E; also, the erase signal $C_2$ is in the 1 state. The item present at input X of stage $R'_1$ is the bit of rank *y*+1 and the item at input X of stage $R''_1$ is signal $C_1$, which is in the 1 state. A write-in occurs only if the bit of rank *y*+2 is in the 0 state, denoting that the store is unsaturated. Write-in then takes place, giving rise to a clock pulse. The written-in information therefore consists of *y*+2 — i.e., *y* actual data bits plus the overflow bit for the input $E_{y+1}$ and the 1-state marking bit. The clock pulses shift the data written-in previously.

Data can be read out of the store in response to the request of a read-out facility downstream. Reading-out can occur only in the phase when the signal $C_1$ is in the 0 state or read-out permission state — i.e., in the phase when fresh data cannot be written in.

As previously stated, the data at the A B inputs of the stages R are those of the corresponding outputs S. It can also be confirmed that the data at the X inputs of the stages $R'_1$ and $R''_1$ are the same as the data from the outputs $S_{y+1}$ and $S_{y+2}$ respectively. To read-out data, therefore, the clock is made to produce consecutive shifts until the marking bit at output $S_{y+2}$ changes over from 0 to 1, whereupon the oldest data item in the store is available at outputs $S_1$ . . . $S_y$, accompanied by the overflow bit $S_{y+1}$ and the marking bit $S_{y+2}$. After the data has been obtained by the read-out facility or, alternatively, by a known auxiliary buffer store, the data remaining in the store are looped back to the inputs as follows: First, signal $C_2$ changes over from the 1 state to the 0 state, whereafter a clock pulse occurs. The data item available at the outputs and already read by the readout facility is looped back to the store input. Since this looping-back or feedback occurs with the Y inputs of the stages $R'_1$ and $R''_1$ in the 0 state, the item returned to store has bits of rank *y*+1 (overflow bit) and *y*+2 (marking bit) in the 0 state — i.e., that particular item will not be considered in a subsequent read-out. The control signal $C_2$ then returns to the 1 state, whereafter clock pulses occur to loop the other stored data back to the store input but without erasing their marking bit. Looping-back operations continue as long as the bit of output $S_{y+2}$ remains in the 1 state. When it becomes 0, looping-back ceases, the clock pulses stopping. The store is therefore in the state previous to the start of the read-out phase, but the read-out item has been erased and the remaining operative data are stored in read-in order on the input side of the store.

Considering now the third aspect — i.e., overflow of the store or the condition of the memory being so full as to be unable to receive further data without outputting the oldest data, with the possibility of the latter being read by the read-out facility and thus being lost — overflow occurs when $S_{y+2}$ is in the 1 state in the write-in permission phase ($C_1$ being in the 1 state). A known logic (not shown), such as a store or bistable, brings the bit $E_{y+1}$ to the 1 state. Any further write-in can be inhibited by action on the clock pulse generator. Subsequently, when the read-out facility has cleared one or more addresses or locations, the fresh data which can now be received in the store are accompanied by the bit of rank *y*+1 in the 1 state. Consequently, when the read-out facility receives a data item having such bit in the 1 state, it is warned that such data item was stored after an overflow and other data may therefore have been lost. This *y*+1 bit can be changed back to the 0 state, for instance, by means of a delay circuit which provides an appropriate delay and which is triggered by detection of a vacant store address or by any other equivalent means.

The example mentioned uses only logic NAND circuits, but any other equivalent system of logic circuits of a different kind can be used without departure from the scope of the invention. Similar considerations apply to the logic states specified; they can be reversed.

The store according to the invention is of use for some aspects of data transmission.

I claim:

1. A stacking store having overflow indication and of use for the transmission of binary data in the chronological order of their input (write-in), characterized in that it comprises:

1. store circuits equal to the number of bits in the data to be transmitted, each store circuit comprising: a n stage shift register (each stage having two inputs connected to one another and one output); and three logic type routing gates having two inputs and one output, viz, a first gate whose first input receives the input bit corresponding to output store circuit and whose other input receives a logic type signal permitting write-in into the store, such signal being called "first logic signal" hereinafter, a second gate whose first input is connected to the output of the first gate and whose second input is connected to the output of the third gate, the register having its input connected to the output of the second gate and its output connected to the first input of the third gate, the second input of the latter gate receiving the complement of the first logic signal, the output of each store circuit being the output of its register;
2. a first auxiliary circuit comprising a *n* stage shift register identical to the previous shift register, the two inputs of the first stage not being connected to one another as in (1), one of the latter inputs receiving a logic control signal called the "second logic signal" and serving to erase from the store the information output thereby, to other input being connected to the output of a logic gate having two inputs connected to the respective outputs of two other logic gates each having two inputs and one output, the first of the latter gates having an input receiving an auxiliary bit called "overflow bit" and the other input receiving the first logic signal, the second of the latter gates having an input receiving the complement of the first logic signal, the other input being connected to the output of the previous register which thus forms the output of the first auxiliary circuit, the logic state of the last-mentioned output indicating possible saturation of the store;
3. a second auxiliary circuit comprising a n stage shift register identical to the shift register of the first auxiliary circuit, the first input of the first stage receiving the second logic signal while the second input of the last-mentioned stage is connected to the output of a logic gate having two inputs, one of which receives the complement of the first logic signal while the other input is connected to the output of another logic gate having two inputs, one receiving the complement of the first logic signal and the other being connected to the output of the corresponding register, the latter output delivering an auxiliary bit called "marking bit" and forming the output of the second auxiliary circuit; and
4. a clock pulse generator triggering the stepping-on of the data towards the store output in all the shift-register set forth previously.

* * * * *

UNITED STATES PATENT OFFICE
CERTIFICATE OF CORRECTION

Patent No. 3,815,096 Dated June 4, 1974

Inventor(s) ROLAND S. NAHON

It is certified that error appears in the above-identified patent and that said Letters Patent are hereby corrected as shown below:

IN THE SPECIFICATION:

Column 2, line 13, "which" should read -- while --.

Column 2, line 21, "an" should read -- all --.

Signed and sealed this 11th day of February 1975.

(SEAL)
Attest:

RUTH C. MASON
Attesting Officer

C. MARSHALL DANN
Commissioner of Patents
and Trademarks